Patented Feb. 22, 1949

2,462,341

UNITED STATES PATENT OFFICE 2,462,341

CLEANING COMPOSITION FOR RUST-STAINED LACQUERED SURFACES

Breckinridge Kenney Tremaine, Wilmington, Del., assignor to E. I. du Pont de Nemours & Company, Wilmington, Del., a corporation of Delaware No Drawing. Application September 24, 1946, Serial No. 699,094

2 Claims. (Cl. 252—100)

This invention relates to cleansing compositions and more particularly to cleansing compositions containing hydrocarbon sulfonates, free hydrocarbons and water-soluble organic acids such as oxalic acid and to their use in the removal of rust, rust stains, oxide films, grease, oil, carbon and other solid soils from painted, lacquered, varnished, enameled, vitreous enameled and like surfaces.

It is an object of this invention to provide a composition of matter adapted for efficient removable of rust, rust stains, oxide films, grease, oil, carbon and other solid soils from painted, lacquered, enameled, varnished, vitreous enameled and like surfaces without damage to the surface, while leaving said surface cleaner than with use of presently available cleansing compositions. Other and further objects of this invention will appear as the description proceeds.

These objects are accomplished by this invention as follows: To an aliphatic hydrocarbon-sulfonate mixture containing free aliphatic hydrocarbon, such as the mixture disclosed in U. S. P. 2,334,764, Example IV, is added an organic acid such as pulverized oxalic acid. This combination is mixed until homogeneous. The cleaning composition thus formed is prepared with sufficient of the acid to give the product an acid reaction (say, pH=5 or less). The product is dispersed in warm water to a homogeneous dispersion. The aqueous dispersion is brushed or swabbed onto the surface to be cleaned and allowed to dry. It is then rinsed in running water. The strength of the dispersion, the number of applications and rinses and the length of time that each application is allowed to remain on the surface will vary depending upon the nature of the soil on the surface, the tenacity of the oxide film or stain and the thickness of the soil deposit. I find that with the novel cleansing composition of this invention, the cleaned surface is not damaged by any abrasive and becomes free from all soil, thus enabling the application of a new surface coat of lacquer, paint, etc., the latter being readily and thoroughly bonded to the cleaned surface.

Now, to describe my invention in more detail, the composition of my new and improved cleansing agent is preferably as follows:

| | % by wt. |
|---|---|
| Mixture of aliphatic hydrocarbon and aliphatic hydrocarbon-sulfonate | 90 to 50 |
| Pulverized oxalic acid (dihydrate) | 10 to 50 |

As mixture of aliphatic hydrocarbon and aliphatic-hydrocarbon sulfonate I prefer to use the softening agent described in U. S. Patent No. 2,334,764. In this patent, saturated aliphatic hydrocarbons having 16 or more C-atoms per molecule are treated with gaseous sulfur dioxide and chlorine under the influence of actinic light, until a portion of the hydrocarbon, say from 10 to 50% thereof, has been converted into a sulfonyl-chloride derivative. The mixture is then hydrolyzed with alkali, whereby the SO₂Cl groups become converted into sulfonic acid groups. A convenient and practically most desirable agent is the one described in Example IV of said patent, wherein the degree of chlorosulfonylation is close to the 50% limit. In this example, 3 parts by weight of paraffin wax (estimated as having about 26 C-atoms per molecule) is mixed with 1 part of petrolatum (estimated as having about 16 C-atoms per molecule) and the mixture is subjected to the action of gaseous sulfur dioxide and chlorine until the weight of the reaction mass has increased about 33%. At this stage about 50% of the hydrocarbon mixture is believed to have been converted into an SO₂Cl derivative. The mixture is then treated with an excess of aqueous sodium hydroxide, whereby the SO₂Cl groups become hydrolyzed into sodium-sulfonate groups.

The oxalic acid may be anhydrous or the hydrated acid $(COOH)_2 \cdot 2H_2O$. The above indicated percentage limits are based on the weight of the dihydrate. The preferred composition is 75 parts by weight of the hydrocarbon sulfonate mixture and 25 parts by weight of pulverized oxalic acid (dihydrate). The mixing is preferably performed at 50–55° C. when using the preferred sulfonated hydrocarbon mixture, but this temperature is selected only for the sake of efficient mixing of the components to a homogeneous product. The mass is agitated and discharged into drums where it cools to a homogeneous paste. The paste and its aqueous dispersions all react strongly acidic (i. e. acid to Congo red).

Without limiting my invention, the following examples will illustrate further my preferred mode of procedure. The quantities of materials indicated may be varied at will as long as the same relative proportions by weight are maintained.

*Example 1.—Preparation of cleaning dispersion*

A dispersion is prepared by adding 32–42 oz. of the cleaning compound to one gallon of water at 140–200° F. The paste is thoroughly dispersed by mechanical agitation. It is allowed to cool and is applied at 100° F.

Example 2.—Application of cleaning dispersion

The application is made by brushing or swabbing the dispersion onto the soiled surface by means of a brush, cloth, pad, sponge, etc. The dispersion should be spread evenly over the soiled surface. A second coat may be applied in case the soil film is heavy or especially tenacious. The treated surface is allowed to stand for 10 minutes or more. It is then rinsed with running water. Warm rinse water is preferable but not necessary. A second coating of the cleansing dispersion should then be applied to insure an even removal of all soil. This second coat should be followed by immediate rinsing with running water. A test patch should be made on the soiled surface and subsequent work on the surface should equal the test patch in cleanliness. The cleaning of a test patch will also indicate the tenacity and thickness of the soil and allow the operator to judge how many treatments and rinses will be necessary to produce the desired cleanliness. The cleaning with this product in no way scratches or impairs the surface lacquer, enamel, varnish, paint or vitreous enamel under the conditions of use prescribed, leaving the surface free of all oxide film, stain, scale, rust and other soil. Such a cleaned surface, for instance a lacquered surface, affords a better bond for a subsequent coat of lacquer.

The following additional examples will show my experience with my new cleansing composition when applied to the solution of actual, commercial cleaning problems:

Example 3

The outside surface of a very badly soiled railway passenger car, having a surface coating of lacquer, was treated with a dispersion of 8 pounds of cleansing product in three gallons of water. The cleansing product contained 75 parts by weight of hydrocarbon-sulfonate mixture and 25 parts by weight of pulverized oxalic acid. The dispersion was prepared with hot water, (140–200° F.), and cooled to around 100° F. before applying. The soil on the surface of the car had been analyzed as 97% iron oxide and 3% grease, oil, carbon and silicate soil. It was extremely tenacious. Four applications of the cleansing dispersion were made with a rinse after each application. Application was made to the complete car and then the whole was rinsed.

Seven hours was the total time expended in the above operation. This is contrasted with the prevailing procedure using oxalic acid alone, 3 lbs. of oxalic acid being dissolved in 4½ gallons of water. Five applications of the acid solution and a final application of soap, with rinses between applications, were required for a similar car. A total of 10 hours was expended on this process. The cars in the two cases were comparable in the amount and were the same in the type of soil present on the outside surface. Much more vigorous scrubbing was required to obtain a clean surface using oxalic acid alone. The cleansed surface of the car using the cleansing mixture of this invention was cleaner and the lacquered surface showed no scratches, loosening of lacquer or soap streaks. There was not only a saving of 30% in time, but also a better and cleaner surface was obtained.

Example 4

A vitreous enameled sign was badly stained by rust from nuts and bolts in the face of the sign. Ordinary abrasive scouring cleansers and alkaline cleaners, soaps and the like were applied with no cleansing effects. Mineral acids could not be used because of etching of the surface and destruction of the gloss of the sign. The 75:25 cleansing composition above defined, when applied either concentrated or diluted to 10–20%, quickly and effectively removed the stains with absolutely no damage to the surface or the gloss of the vitreous enamel sign.

Other surfaces which have been successfully cleaned with the sulfonate-oxalic composition of this invention are stained concrete and cement, stained and darkened wooden floors and filter beds of sand or stone.

In the above examples oxalic acid was preferred for the reason that the soil to be removed contained iron rust, and oxalic acid is well known for its capacity to dissolve iron stains without injuring a painted surface. Where soil of a different nature is involved, for instance grease, carbon, etc., other aliphatic carboxylic acids which are known to have cleansing action on such types of soil may be employed, for instance, acetic, hydroxyacetic, citric, tartaric, succinic, malonic, malic or formic acids. Their substitution in the above composition-formula should be on an acid-equivalent basis.

My invention may be applied in practice to the cleaning of brewery equipment, laundry marks, rust and inkstains on cloth, iron, lithographic stones, metallic wires, automobile bodies and milk can interiors.

It will be understood that my invention is susceptible of many other variations and modifications without departing from the spirit thereof.

I am aware that oxalic acid has been suggested heretofore as a rust remover either by itself or in conjunction with other cleaning agents, such as soap and synthetic detergents. My novel composition differs from these former suggestions or uses in the following respects: In these former combinations, in the selection of the synthetic detergent, emphasis was laid on wetting and detergent properties. My present invention is based on the discovery that softening action is the all important factor, inasmuch as the carboxylic acid itself, for instance oxalic acid, has the requisite soil-dissolving action to a sufficient degree.

Also, my novel cleansing agent has an acid reaction, whereas the hitherto suggested compositions of oxalic acid with soaps and sodium bicarbonate would be generally alkaline or neutral, inasmuch as oxalic acid in higher concentrations would not be compatible with soap. As a result of its acid nature, my novel cleansing composition does not produce much foaming or frothing, which in itself is objectionable because it produces a streaky effect on the cleaned surface. Again, the composition of this invention removes rust stains, soil and grit without hard scrubbing; consequently, the cleansed surface is not marred, scratched or damaged, whereas the use of oxalic acid alone or oxalic-acid-soap compositions would require considerable mechanical work on the surface. Another consequence of the facility with which my novel composition works is that it can be applied to corrugated surfaces or other surfaces having sharp curves and angles wherein mechanical abrasion cannot be applied very efficiently. No novel composition and process are more efficient in point of time, and furthermore renovate the cleansed surface to a much higher degree than was achievable by heretofore known cleansing agents.

While I do not wish to limit my invention to any particular theory, it appears to me that the special effectiveness of my novel combination-agent for the purposes aforenoted is due to the special composition of the hydrocarbon: hydrocarbon-sulfonate assistant, which apparently has a softening action on the film of soil which is to be removed, facilitating its disintegration and subsequent removal from the surface to which it is attached. This surprising effect constitutes the basic discovery on which this invention rests.

For although U. S. Patent No. 2,334,764 emphasizes the qualities of this peculiar reagent as a softener for textile fiber, it was not to be foreseen that it would have a softening effect on a non-fibrous film of soil which is caked on to a painted or metallic surface.

I claim as my invention:

1. A cleansing composition comprising as active ingredients from 10 to 50 parts by weight of oxalic acid (based on the formula of the dihydrate) and from 90 to 50 parts by weight of a composite softening agent which consists of a partially sulfonated saturated aliphatic hydrocarbon having at least 16 carbon atoms per molecule, the degree of sulfonation in said composite softening agent being from 10 to 50% of its total hydrocarbon content.

2. A cleansing composition comprising as active ingredients substantially 25 parts by weight of oxalic acid dihydrate and 75 parts of a composite softening agent which consists of a substantially equimolecular mixture of a sulfonated aliphatic hydrocarbon and an unsulfonated aliphatic hydrocarbon, the hydrocarbon in both cases being a mixture of saturated hydrocarbons having a chain length of 16 to 26 C-atoms per molecule.

BRECKINRIDGE KENNEY TREMAINE.

REFERENCES CITED

The following references are of record in the file of this patent:

UNITED STATES PATENTS

| Number | Name | Date |
| --- | --- | --- |
| 1,954,747 | Peterson | Apr. 10, 1934 |
| 2,174,110 | Reed | Sept. 26, 1939 |
| 2,197,800 | Henke et al. | Apr. 23, 1940 |
| 2,334,764 | Henke et al. | Nov. 23, 1943 |